United States Patent
Yang et al.

(10) Patent No.: US 7,878,660 B2
(45) Date of Patent: Feb. 1, 2011

(54) METHOD FOR CONTROLLING A COOLING DEVICE OF A PROJECTING SYSTEM AND THE PROJECTING SYSTEM THEREOF

(75) Inventors: Shun-Chieh Yang, Taipei Hsien (TW); Chun-Ming Shen, Taipei (TW)

(73) Assignee: Qisda Corporation, Taoyuan County (TW)

(*) Notice: Subject to any disclaimer, the term of this patent is extended or adjusted under 35 U.S.C. 154(b) by 870 days.

(21) Appl. No.: 11/723,698

(22) Filed: Mar. 21, 2007

(65) Prior Publication Data

US 2007/0279596 A1 Dec. 6, 2007

(30) Foreign Application Priority Data

May 30, 2006 (TW) ................ 95119227 A

(51) Int. Cl.
G03B 21/16 (2006.01)
G03B 21/18 (2006.01)
G03B 21/00 (2006.01)
H01J 17/28 (2006.01)
H01J 19/74 (2006.01)

(52) U.S. Cl. .................. 353/52; 353/122; 315/117

(58) Field of Classification Search .......... 353/52, 353/57, 121, 264, 294, 263, 265; 348/748; 315/117

See application file for complete search history.

(56) References Cited

U.S. PATENT DOCUMENTS

| | | | | |
|---|---|---|---|---|
| 5,990,627 A | * | 11/1999 | Chen et al. | 315/117 |
| 6,467,911 B1 | * | 10/2002 | Ueyama et al. | 353/87 |
| 2005/0024600 A1 | * | 2/2005 | Cole et al. | 353/85 |
| 2005/0052622 A1 | * | 3/2005 | Morishita | 353/85 |

FOREIGN PATENT DOCUMENTS

JP  2004164999 A  *  6/2004

OTHER PUBLICATIONS

Kaneko, Kunikiyo; JP 200416499 A; Machine translation in English.*

* cited by examiner

*Primary Examiner*—Georgia Y Epps
*Assistant Examiner*—Ryan Howard

(57) ABSTRACT

A method for controlling a cooling device within a projecting system is provided. The cooling device cools the projecting system with a predetermined period after the illumination device of the projecting system is turned off. Then, after the projecting system is restarted, it is detected that whether the illumination device is lighted or not. As the illuminating device is not lighted, the predetermined period is extended.

1 Claim, 4 Drawing Sheets

METHOD FOR CONTROLLING A COOLING DEVICE OF A PROJECTING SYSTEM AND THE PROJECTING SYSTEM THEREOF

BACKGROUND OF THE INVENTION (1) Field of the Invention

This invention relates to a method for controlling a projecting system, and more particularly relates to a method for controlling a cooling device of a projecting system.

(2) Description of the Prior Art

The development of projecting technology in present has a tendency toward the objects of small size, high brightness, and low noise. In order to achieve the object of high brightness, a high intensity light source must be used to show a clear and bright image. The light source applied in most projecting systems nowadays is the high intensity discharge (HID) lamp, such as the metal halide lamp (MHL), the ultra high pressure (UHP) mercury lamp, the xenon arc lamp, and etc.

The lamp of the projecting system usually operates under high operating temperature. Take the UHP mercury lamp for example. As the lamp is operating, the pressure will be enhanced to about 200 Pa and the operating temperature to about 1000° C. Due to the high operating temperature, the cooling device such as a fan is critical for normal operation of projecting system. That is, the cooling device must be started to remove the heat generated by the lamp as the projecting system is operating so as to keep the interior temperature of the projecting system below a predetermined temperature to maintain the normal operation of the projecting system.

The operation character of the lamp is mentioned below. Take the UHP mercury lamp for example. As the lamp is lighted, a plasma arc is generated between the opposite electrodes thereof, and the liquid mercury in the lamp is evaporated to generate strong illumination. Since mercury vapor is not a good conductor, the plasma arc for lighting the lamp can be generated only as the mercury in the lamp is in liquid state. That is, after reaching the operating temperature (about 1000° C.), the mercury lamp must be properly cooled below the boiling temperature of mercury (about 450° C.) or the mercury lamp cannot be re-lighted.

After the lamp is turned off, the projecting system in present usually has the cooling device keep operating for a predetermined period to cool the lamp. This procedure may prevent the lamp from exploding and guarantee lighted as the projecting system is restarted. However, the above mentioned method has the drawback that since the heat dissipation ability of cooling device is influenced by the operating environment of the projecting system, the temperature of the mercury within the lamp may be still too high to have the lamp lighted as located in a poor heat-dissipation environment, such as a closed space.

Accordingly, the present invention focuses on the above mention drawback about the traditional method for cooling projecting systems and provides a method to solve this problem. This method detects the lighting event of the projecting system so as to adjust the cooling period of the projecting system automatically. In addition, the method provided in the present invention may figure out a best cooling period for the projecting system according to the operating environment so as to reduce the failure rate of lighting, extend the life of lamp, and reduce the waiting time once the lighting fails.

SUMMARY OF THE INVENTION

It is a main object of the present invention to prevent the failure of lighting, extend the life of the lamp, and reduce the waiting time once the lighting fails.

A method for controlling a cooling device of a projecting system is provided in the present invention. The method comprises the steps of: starting the projecting system and lighting the illuminating device; asking the cooling device to cool the projecting system with a predetermined period after the illuminating device is turned off; *detecting whether the illuminating device is lighted or not as the projecting system is restarted; and elongating the predetermined period as the lighting fails.

According to the method, a projecting system is also provided in the present invention. The projecting system has an illuminating device, a cooling device, and a control unit. The cooling device is utilized for cooling the projecting system, especially the illuminating device. The control unit is utilized to send a driving signal for driving the illuminating device and receive a response from the illuminating device to detect whether the illuminating device is lighted or not. In addition, the control unit also sends a cooling control signal to the cooling device to determine the cooling period.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
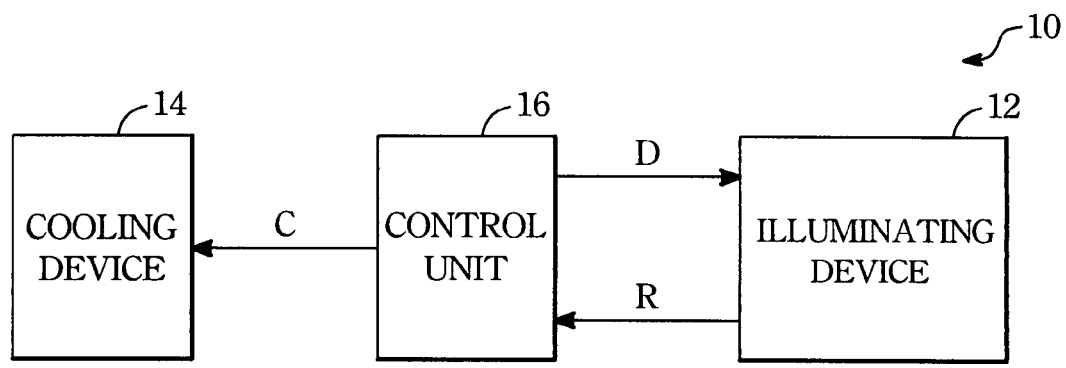
FIG. 1 is a block diagram showing a preferred embodiment of a projecting system in accordance with the present invention.

FIG. 1 is a block diagram showing a preferred embodiment of a projecting system in accordance with the present invention. As show, the projecting system 10 has an illuminating device 12, a cooling device 14, and a control unit 16. Basically, the projecting system 10 may be a digital projector, a liquid crystal (LC) projecting television, and etc. The illuminating device 12 may be a metal halide lamp, an ultra high pressure (UHP) mercury lamp, or a xenon arc lamp. The cooling device 14 is utilized for cooling the projecting system 10, especially the illuminating device 12 featuring a high operating temperature. The control unit 16 has a connection with the illuminating device 12 for sending a driving signal D to drive the illuminating unit 12 and receiving a response signal R from the illuminating device 12 to detecting whether the illuminating device 12 is lighted or not. The control unit 16 also has a connection with the cooling device 14 for sending a cooling control signal C to determine the cooling period that the cooling device 14 cools the projecting system 10. It is noted that after the illuminating unit 12 being used is turned off, the control unit 16 sends the cooling control signal C to the cooling device 14 for asking the cooling device 14 keep cooling the projecting system 10 with a predetermined period T.

Figure 2:
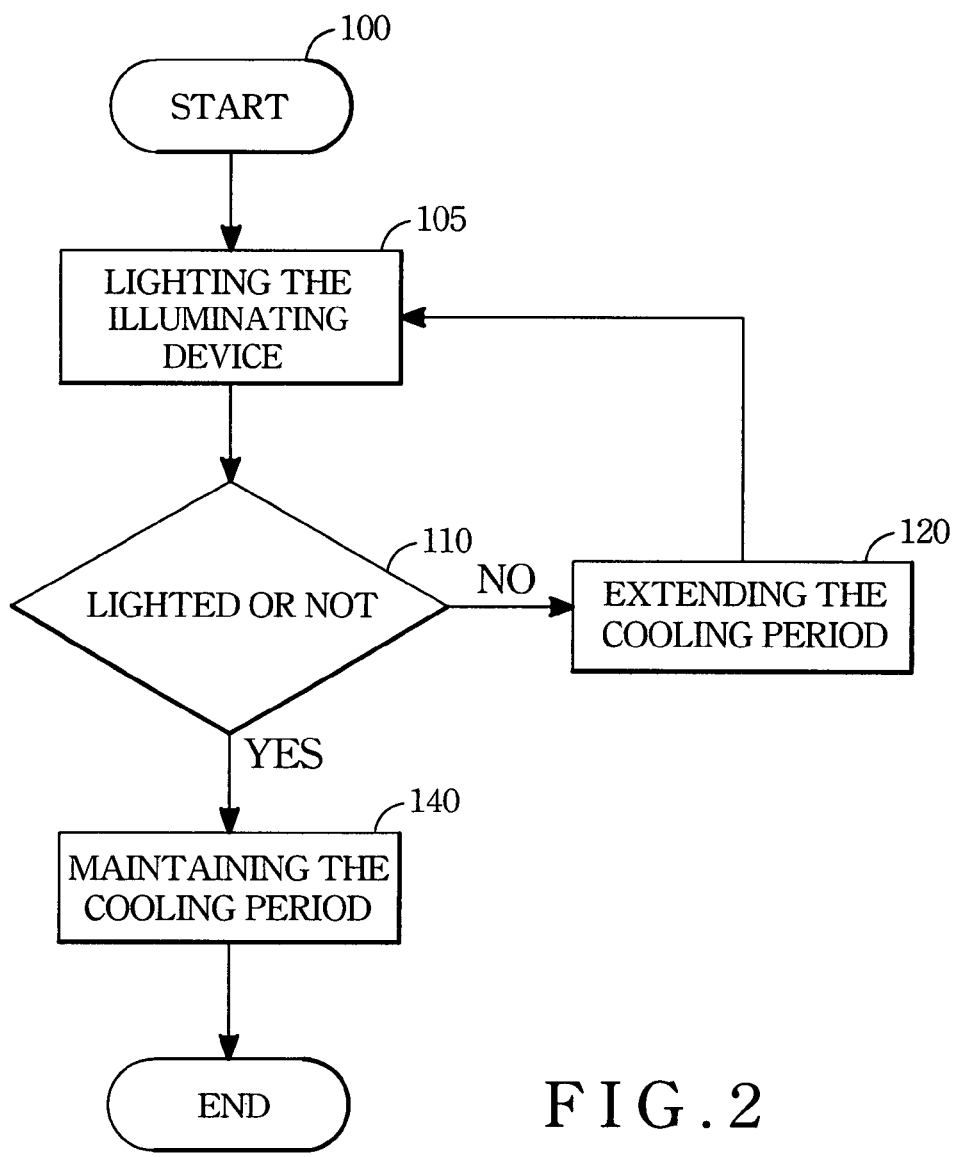
FIG. 2 is a flowchart showing a preferred embodiment of the method for controlling the cooling device within the projecting system in accordance with the present invention.

FIG. 2 is a flowchart showing a preferred embodiment of a method for controlling the cooling device of FIG. 1. As shown, after the projecting system 10 is started (step 100), the control unit 16 tries to light the illuminating device 12 immediately (step 105). Afterward, the control unit 16 detects whether the illuminating device 12 is lighted or not by checking the response signal R from the illuminating device 12 (step 110). As the illuminating device 12 is lighted, the predetermined period T is adopted as the cooling period (step 140). That is, after using the projecting system 10 and turning off the illuminating device 12, the cooling device 14 cools the illuminating device 12 with the predetermined period T. Whereas, as the lighting step (step 105) fails, the control unit 16 extends the cooling period from the predetermined period T to an extended time T' (step 120). That is, the cooling device 14 may cool the illuminating device 12 with the cooling period of the extended time T' rather than the predetermined period T. In addition, after cooling the illuminating device 12 with the cooling period of T', the control unit 16 tries to light the illuminating device 12 (step 105) again. As the illuminating device 12 is lighted in the present lighting step, the control unit 16 maintains the extended cooling period T'. That is, as the projecting system 10 is restarted, the predetermined cooling period set in the control unit 16 is extended from T to T'.

As a preferred embodiment, the control unit 16 is set with a variable cooling period and also a time interval t. In the above mention step 120, as the control unit 16 detects that the lighting step (step 105) fails, the control unit 16 extends the cooling period form the predetermined period T to T' based on the time interval t (T'=T+t). It is also understood that as the lighting step fails twice, the cooling period set in the control unit 16 would be extended from T to T'' (T''=T+2t).

Figure 3:
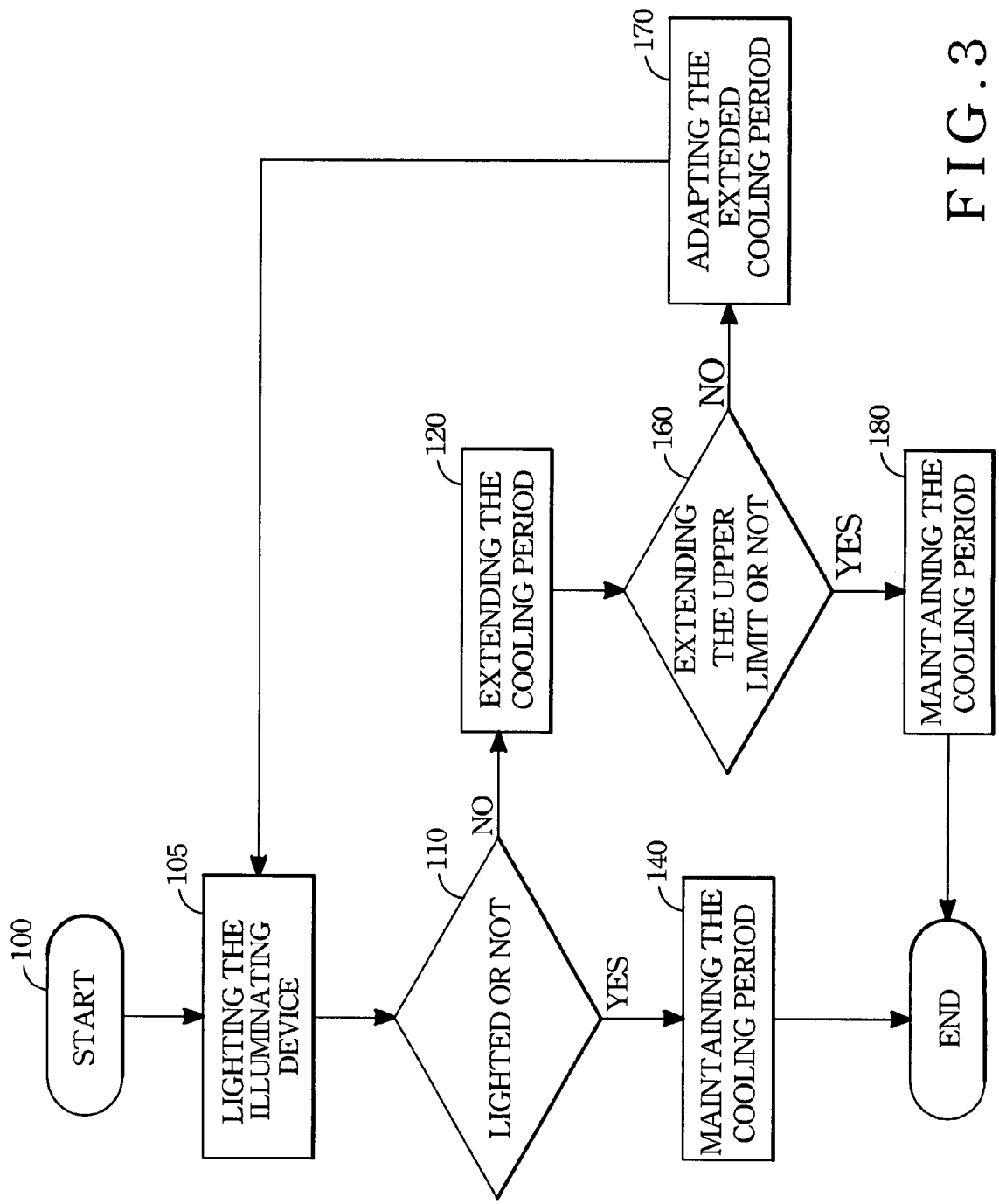
FIG. 3 is a flowchart showing another preferred embodiment of the method for controlling the cooling device within the projecting system in accordance with the present invention.

However, the above mentioned method has a drawback that as the lighting step fails repeatedly, the cooling period may be over-extended to result too much waiting time and badly affect the life of illuminating device 12. In order to prevent such problems, as shown in FIG. 3, after elongating the cooling period from T to T' (step 120), a step 160 for determining whether the extended cooling period T' exceeds an upper limit $T_L$ or not is provided in the present embodiment. As the extended cooling period T' does not exceed the upper limit $T_L$, as shown in step 170, the cooling device 14 adapts the extended predetermined cooling period T' to cool the illuminating device 12 after the operation of the projecting system 10, and the cooling period set in the control unit 16 is extended to T' as the projecting system 10 is restarted. Whereas, as the extended cooling period T'' exceeds the upper limit $T_L$, as shown in step 180, the original cooling period remains. That is, the cooling device 14 will cool the illuminating device 12 with the last cooling period T' rather than the extended cooling period T'' after the operation of the projecting system, and the cooling period set in the control unit 16 as the projecting system restarted is still T'.

Figure 4:
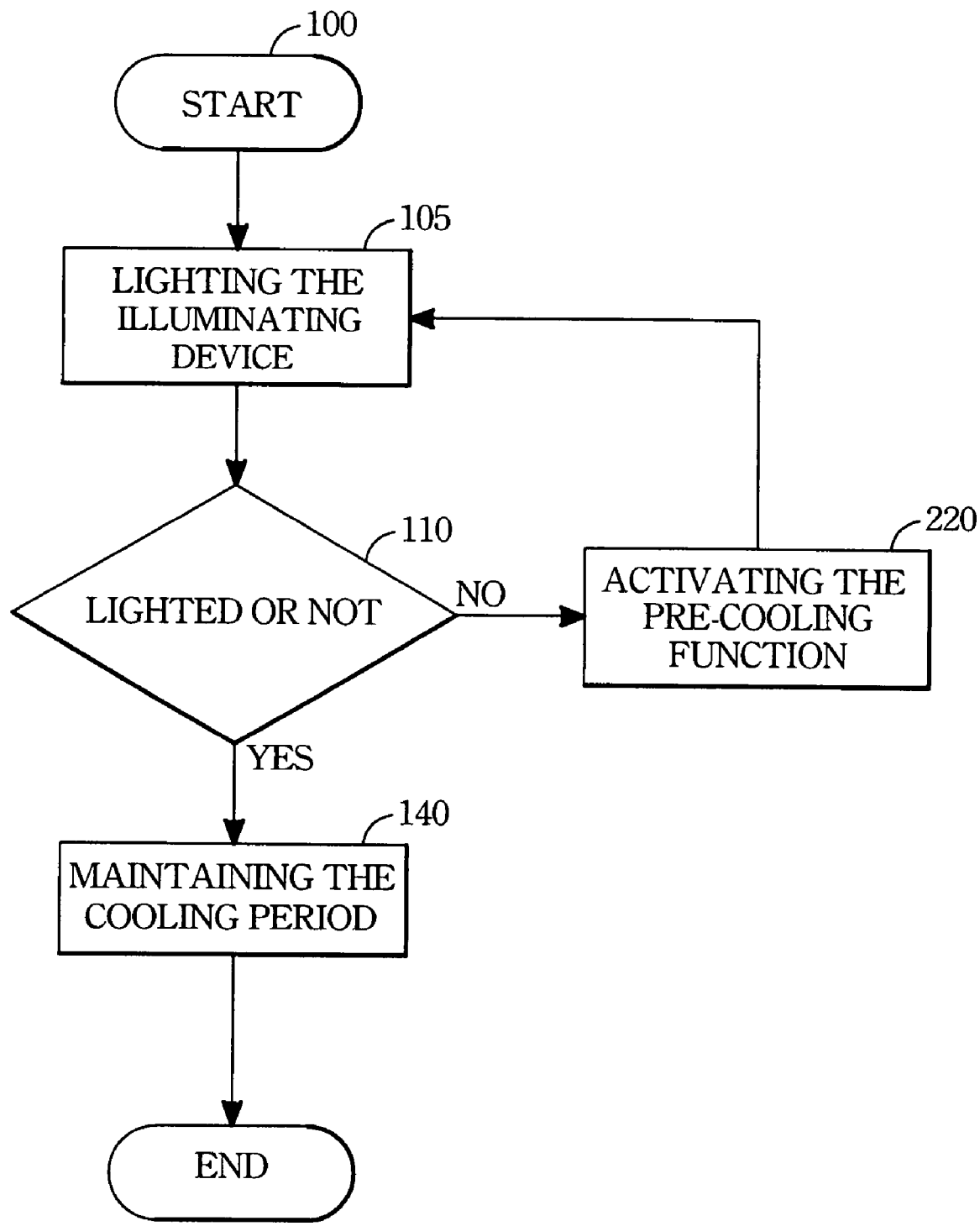
FIG. 4 is a flowchart showing the other preferred embodiment of the method for controlling the cooling device within the projecting system in accordance with the present invention.

In compared with the above mentioned embodiment, which cools the projecting system 10 after the illuminating device 12 is turned off, another embodiment as shown in FIG. 4 is provided to cool the illuminating device 12 after the projecting system 10 is started and before the illuminating device 12 is lighted. As shown, following the step 110 of FIG. 1, as the lighting step (step 105) fails, as shown in step 220, a specific function (the pre-cooling function) of the control unit 16 is activated to cool the projecting system 10 right after the projecting system 10 is restarted. Thereby, after the projecting system 10 is restarted, the control unit 16 sends the cooling control signal C to the cooling device 14 firstly to cool the projecting system 10 before sending the driving signal D to light the illuminating device 12. It is noted that the present embodiment does not interfere with the embodiment of FIG. 1 and the two embodiments can be applied simultaneously.

Figure 5:
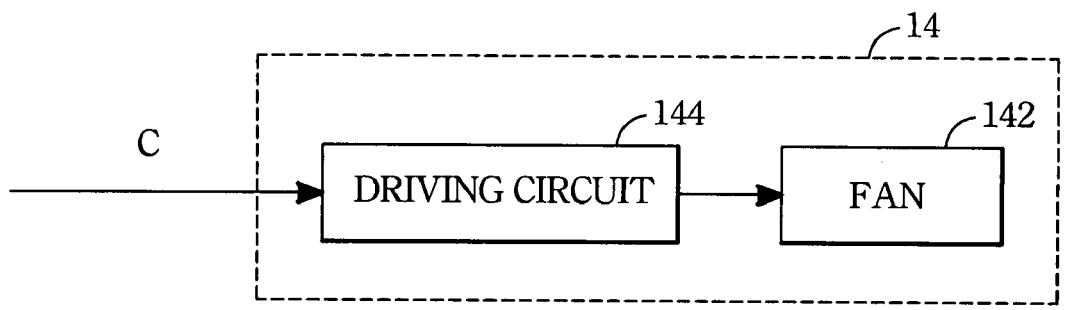
FIG. 5 is a schematic view showing a preferred embodiment of the cooling device in accordance with the present invention.

FIG. 5 shows a preferred embodiment of the cooling device 14 in the present invention. As shown, the cooling device 14 has a fan 142 and a driving circuit 144. The driving circuit 144 is utilized for receiving the cooling control signal C from the control unit 16 and driving the fan 142 according to the cooling control signal C.

Figure 6:
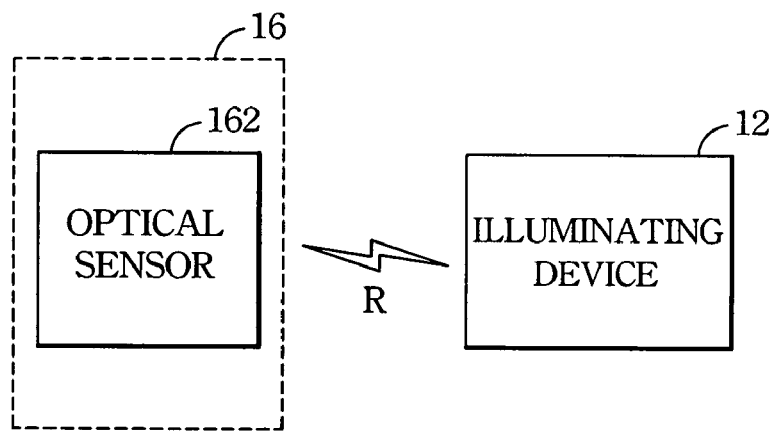
FIG. 6 is a schematic view showing a preferred embodiment of the control unit in accordance with the present invention.

As mentioned, the control unit 16 detects whether the illuminating device 12 is lighted or not by recognizing the response signal R from the illuminating device 12. As shown in FIG. 6, the control unit 16 may use an optical sensor 162 to detect whether the illuminating device 12 illuminates or not so as to determine whether the illuminating device 12 is lighted or not.

Figure 7:
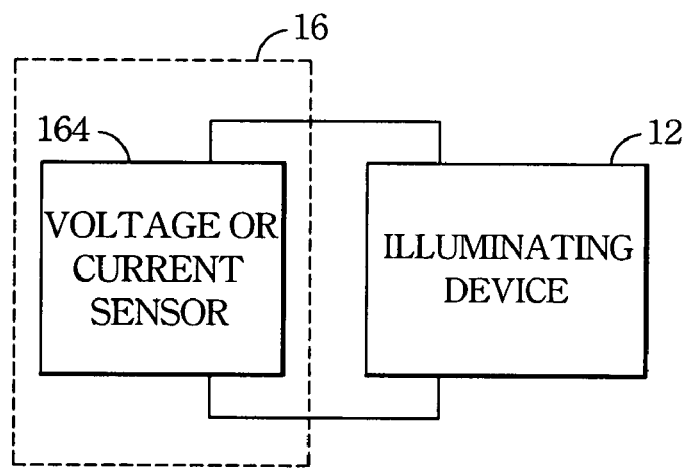
FIG. 7 is a schematic view showing another preferred embodiment of the cooling device in accordance with the present invention.

In addition, as shown in FIG. 7, the control unit 16 may also use a typical voltage or current sensor 164 to detect whether the illuminating device 12 is lighted or not. That is, the control unit 16 may detect the changing of voltage level difference between the opposite electrodes of the illuminating device 12 (as the illuminating device 12 is lighted, the voltage level difference decreases) or detect whether any significant current flowing between the two electrodes (as the illuminating device is lighted, the current exists) to determine whether the illuminating device 12 is lighted or not.

While the embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A method for controlling a cooling device of a projecting system with an illuminating device, the method comprising the steps of:

starting the projecting system and lighting the illuminating device;

cooling the projecting system with a predetermined period as the illuminating device is turned off;

restarting the projecting system and lighting the illuminating device;

detecting whether the illuminating device is lighted or not; and extending the predetermined period as the illuminating device is not lighted;

determining whether the extended predetermined period exceeds an upper limit or not;

cooling the projecting system with the extended predetermined period as the extended predetermined period does not exceed the upper limit and adapting the extended predetermined period and lighting the illuminating device again; and cooling the projecting system with the last predetermined period if the extended predetermined period exceeds the upper limit and lighting the illuminating device again.

* * * * *